Jan. 27, 1942.       L. C. ALESHIRE       2,271,450
FEEDER FOR ANIMALS
Filed Aug. 14, 1939      3 Sheets-Sheet 1
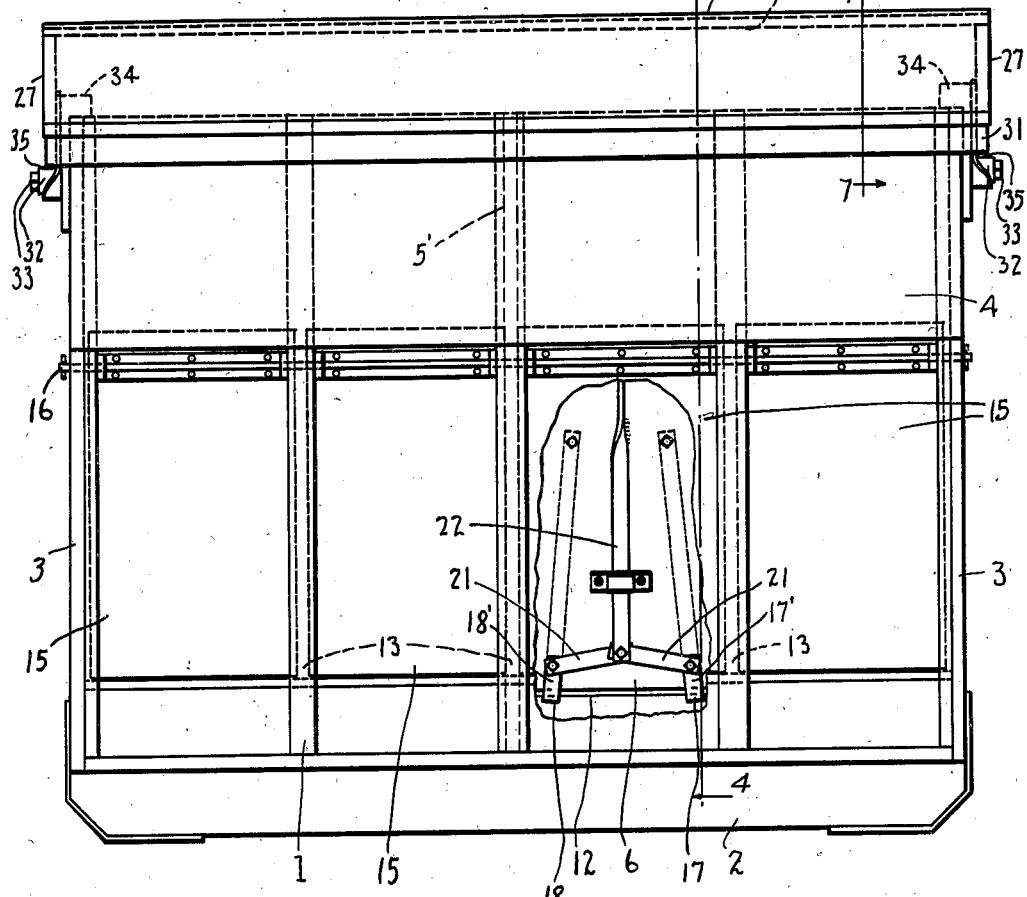
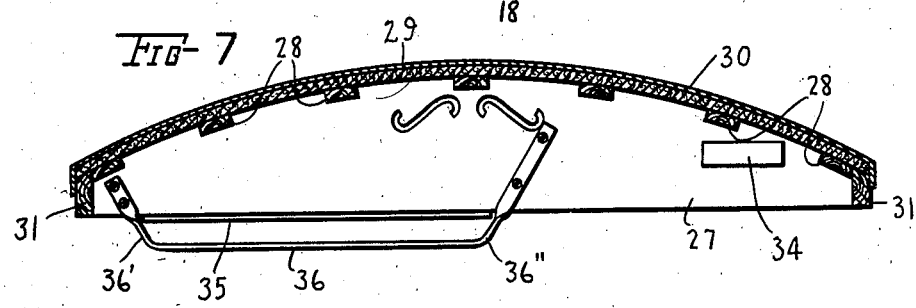
Inventor
Leonard C. Aleshire
By Staley & Welch
Attorneys Jan. 27, 1942. L. C. ALESHIRE 2,271,450
FEEDER FOR ANIMALS
Filed Aug. 14, 1939 3 Sheets-Sheet 2
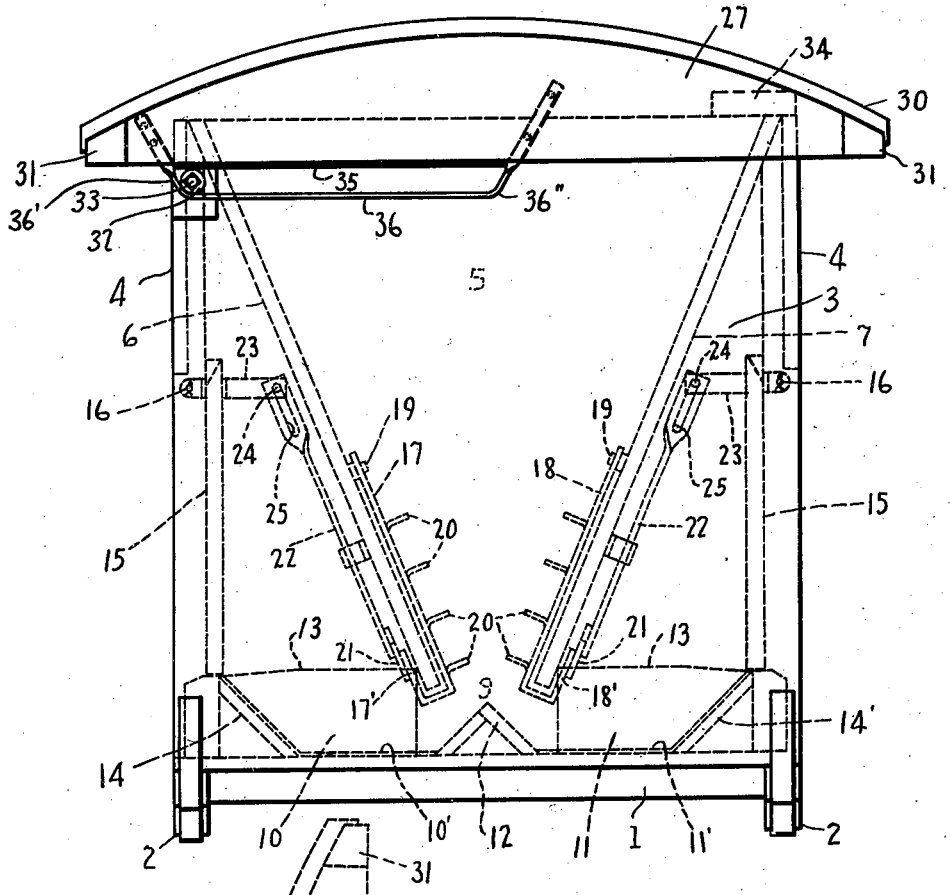
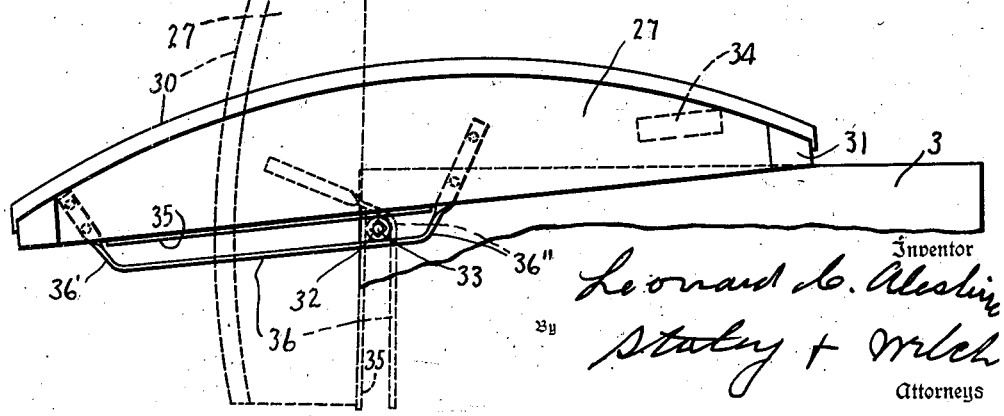
Inventor
Leonard C. Aleshire
By Staley & Welch
Attorneys Jan. 27, 1942.    L. C. ALESHIRE    2,271,450
FEEDER FOR ANIMALS
Filed Aug. 14, 1939    3 Sheets-Sheet 3
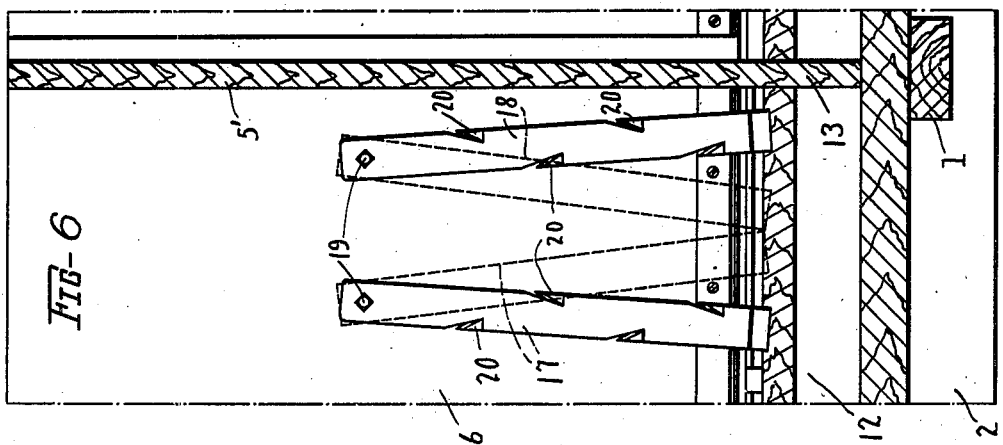
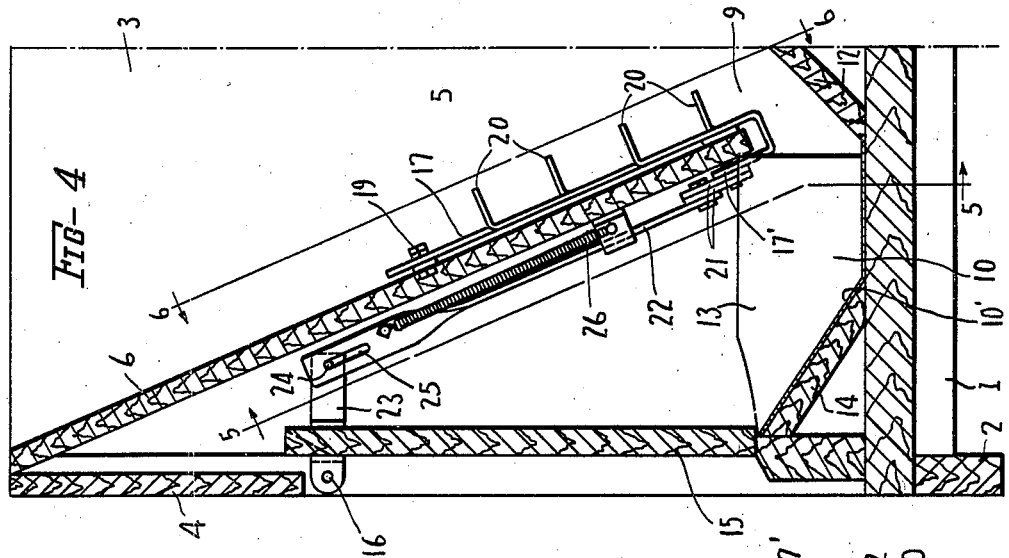
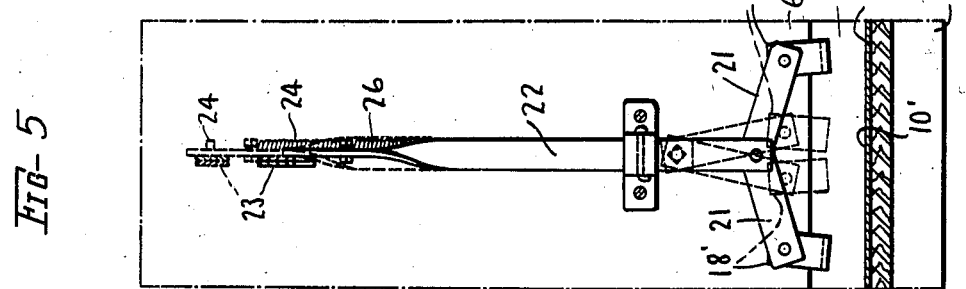
Inventor
Leonard C. Aleshire
By Staley & Welch
Attorneys Patented Jan. 27, 1942

2,271,450

UNITED STATES PATENT OFFICE 2,271,450

FEEDER FOR ANIMALS

Leonard C. Aleshire, Springfield, Ohio

Application August 14, 1939, Serial No. 289,957

7 Claims. (Cl. 119—54)

This invention relates to improvements in hog feeders, it relating more especially to improved means for the prevention of clogging, caking or lodging of feed in the feeder.

In the type of feeder to which the invention is particularly adaptable the feed is stored in a hopper-shaped compartment from which the feed gravitates to receptacles from which the animals feed. For reasons of economy it is preferable to allow the feed to flow down only as it is being consumed, and when the animals are not feeding, to close off the feeding compartment from the weather to avoid spoilage of feed from that cause.

The nature of the feed, however, often causes a lodging of feed in the hopper so that it does not readily flow down into the receptacle; therefore, one of the objects of this invention is to provide improved means associated with the feeding compartment closure members to effectively agitate the feed when the animal moves the closure to gain access to the feed.

Another object is the provision of an improved cover for the feeder, the cover being designed to allow access to the feed hopper when replenishing the hopper in varying stages of openings including a fully opened position, and to provide a cover that will not become unmanageable in high winds.

Other objects and advantages will appear from the following specification and claims as illustrated in the drawings.

In the accompanying drawings:

Fig. 1 is a front elevation of an improved hog feeder in which the principles of the invention are embodied.

Fig. 2 is an end elevation.

Fig. 3 is a partial end elevation similar to Fig. 2 but with some of the parts in a different working position.

Fig. 4 is a partial transverse vertical sectional view, the view being taken on the line 4—4 of Fig. 1 and being on a larger scale, showing feed agitator parts.

Fig. 5 is a partial longitudinal sectional view on the same scale as Fig. 4 and taken on the line 5—5 of Fig. 4, further showing feed agitator parts.

Fig. 6 is a fragmentary longitudinal sectional view on the line 6—6 of Fig. 4 and on the same scale, showing some of the agitator parts as seen from inside the hopper.

Fig. 7 is a transverse, vertical sectional view on the line 7—7 of Fig. 1 and on the same scale as Fig. 1, the view being a further explanatory illustration of the manner in which the cover is constructed.

Referring to the drawings, the general frame work of the feeder is represented at 1. The frame work 1 is preferably mounted on sills 2 which serve as skids or runners and has end portions 3 which serve also as the ends of the hopper. Along the upper portions of the feeder box there are provided the sidings 4 on each side, the sidings extending downwardly a relatively short distance.

In the present instance, the entire central portion of the feeder is given over to the hopper represented at 5, although it will be understood that partitions could be provided, if desired, as indicated at 5', Fig. 6. The longitudinal sides of the hopper are in the form of the sloping members 6 and 7 which join to the previously mentioned feeder ends 3.

Below the outlet 9 of the hopper are the feeding troughs 10 and 11 running longitudinally of the feeder and separated one from the other by the inverted V-shaped divider 12. The slopes of the divider cause the down-flowing feed to gravitate further into the troughs. To avoid crowding, the troughs are further divided transversely by partitions 13, which extend inwardly from the inner portions of the frame-work toward the external sides of the sloping hopper members. The partitions, which need not be relatively high partitions, divide the feeder lengthwise into a plurality of feeding compartments or stalls. Filler strips such as shown at 14 and 14' may be employed to make a more effective feeding trough arrangement, as an animal cannot eat from a corner and feed there would be wasted. If desired, the troughs 10 and 11 may be lined with sheet metal as indicated at 10' and 11' as a protection against gnawing.

By the construction thus far described, it is seen that the hopper supplies a plurality of feeding stalls. For the dual purpose of protecting the feed at a time when the animals are not feeding and of insuring by agitator means to be described that the feed will not clog, doors are provided for each stall and preferably each door is connected with an agitator mechanism. The doors are represented at 15, and as shown may be rectangular wooden members pivotally hung from a longitudinally disposed hinge rod 16 passed through bored openings in the framework 1.

Preferably the doors need not open outwardly, a movement inwardly being only necessary, and when swung inwardly it is obvious that the feeding compartment is exposed. In view of the character of much of the animal feed which may often be fibrous and therefore likely to clog if not frequently loosened, an agitator mechanism is so arranged and connected with each door that considerable agitation of the feed is made each time a door is opened, which is caused by the animal, or closed, when the animal leaves the feeder.

Referring to Fig. 6, which is a view inside the hopper, at 17 and 18 are shown agitator bars pivotally hung on pins or bolts 19 secured in the hopper members 6 and 7. Along each side of the bars 17 and 18 are integrally attached out-turned teeth 20 which project into the feed mass. At their lower ends, the agitator bars are bent in a U-shaped manner in order to bring the short legs 17' and 18' of the U on the outside of the hopper wall as seen in Figs. 4 and 5.

By the pivotal suspension of the agitator bars 17 and 18, the bars are capable of a swinging movement illustrated by the full and broken line showing in Fig. 6 which movement effectively disturbs the feed in the vicinity of the bars.

To cause this swinging movement by an opening and closing of a door, a toggle link such as shown at 21 is pivotally connected to the upturned ends 17' and 18' of a pair of agitator bars, and also to a draw-bar 22, Fig. 5, which is slidably mounted on the exterior of the sloping hopper wall. At the upper portion of the door there is provided an inwardly projecting arm 23 in which is fixed an actuating pin 24. The pin 24 projects into a slot 25 formed in the upper end of the draw-bar 22, as seen in Fig. 4.

The proportions and location of the slotted opening 25 in the draw-bar are such that with the door closed as in Fig. 4, and the agitator bars 17 and 18 as shown in full lines in Fig. 6, and the links 21 as shown in full lines in Fig. 5, the draw-bar 22 is in its lowermost position and the upper end of the slot 25 is adjacent the actuating pin 24. Any movement of the door inwardly, then, causes a proportionate swing of the agitator bars toward the broken line showing of the bars as in Fig. 6. To assist in returning the bars 17 and 18 to the normal position as represented by the full lines in Fig. 6, a spring 26 is employed as best seen in Fig. 4.

When a door is opened by forcing it inwardly, obviously the draw bar 22 is drawn upwardly to the broken line showing of Fig. 5, stretching the spring 26, and on the return of the door to closed position, which is by gravity, the spring 26 causes the draw-bar 22 to follow the actuating pin 24 until the door is closed, thereby returning the agitator bars to their normal position.

It is preferable to permit the door to return to the closed position at any time the animal leaves the feeder, in order to avoid spoilage of feed, as by rain. Consequently, in case an agitator arrangement gets out of order so that the spring cannot return the arrangement to normal position, the slot 25 is provided, as the slot allows the door to close regardless of the position of the agitator.

The roof or cover for the feeder consists of a frame-work consisting of end pieces 27 and slats 28 to which in the present instance a sheet 29 of fibrous wall-board material and an outer sheet metal covering 30 are secured. Along each edge is a downwardly depending strip 31 which when the feeder cover is in place forms a water-drip to shed rain, as do also the end pieces 27, as seen in Fig. 1.

In the closed position as in Fig. 1, the cover rests on rollers 32 which are preferably metallic tubular rollers rotatably mounted on studs 33 fixed in the feeder framing 1 at each upper rear corner thereof, and at the forward side on blocks 34 positioned in the inner corners. To prevent undue wear on the cover ends 27 which travel on the rollers, there may be preferably employed metallic wear strips 35, Fig. 7.

To remove the cover, it is lifted at its forward side opposite the rollers until the downwardly depending strip 31 clears the uppermost edge of the feeder frame 1, the cover fulcruming on the rollers at this time. The cover may then be slid back, the rollers eliminating the greater portion of the friction caused by the weight of the moving cover. The cover may be left partially opened, as shown by the full lines in Fig. 3, or opened to a still further fully opened position, as shown by the broken lines in this figure.

To retain the cover on the feeder when in fully opened position or at any other stage of opening, there is provided at each end a guard rail 36 removably secured to the cover end members by bolts as shown. Each end of each guard rail is bent to form a stop, the rearward end being bent as at 36' and properly located to permit full closure of the cover. It is necessary only in closing the cover to draw it forwardly until the bent end 36' makes contact with its respective roller 32 and to then lower the cover to the closed position.

In a similar manner, the forward bent end 36" of the guard rail 36 is so located with respect to the general weight of the cover that when the cover is moved rearwardly until the bent ends 36" strike the rollers 32, it requires but little effort to swing the cover to the fully opened position shown in broken lines in Fig. 3.

Having thus described my invention, I claim:

1. In a hog feeder, a frame-work supporting a feed hopper, sills to support the frame-work, a longitudinal feed trough below the outlet of the feed hopper, a metallic lining for the feed trough, a plurality of transversely disposed partitions to divide the feed trough into feeding stalls, doors normally closing the entrance to the feeding stalls, feed agitator bars pivotally supported in the hopper, said bars extending through the hopper outlet and upwardly on the outside of the hopper to form upturned ends, means connected with the doors and with the said upturned agitator ends to cause a swinging motion of the agitator bars by an opening of the doors, and springs to cause the agitator parts to return to normal position.

2. In a hog feeder, a frame-work, a feed hopper having inclined walls supported thereon and having a longitudinally disposed outlet, a feed trough below the hopper outlet, partitions to divide the feed trough into feeding compartments, a gravity-closed door normally serving as a closure to each feeding compartment, a pair of pivotally suspended agitator bars connected with each door, the connection consisting of links and a draw-bar, the draw-bar having a longitudinally disposed slot near its upper end, and an arm attached to each door having a pin for engagement with the draw-bar by insertion in the slotted opening in the draw-bar, the slots being of such length as to allow the doors to close by gravity.

3. In a hog feeder, a frame-work supporting a partitioned feed hopper having inclined walls, said hopper having a bottom outlet, a feed trough supported by said frame-work disposed below the hopper outlet, a plurality of toothed agitatorbar arrangements pivotally suspended within the hopper, the agitator bars having a U-bend at their lower ends, toggle links pivotally connected with the agitator bars, said agitator bars and links being arranged in pairs, a draw-bar pivotally connected to each pair of toggle links, a spring to return the agitator bars to a normal position, a gravity closed door for said feed trough, and an operative connection between said door and said draw-bar, and a cover for the feeder.

4. In a stock feeder, a feed hopper having an outlet at its lower end, a feed trough to receive the feed from said hopper, an agitator in said feed hopper, a door for said feed trough and operating devices between said agitator and said door comprising a bar on the outside of said hopper pivotally connected with said agitator and having a slot and a crank arm connected with said door and having a pin projecting through said slot, whereby said door may open or close independently of any movement of the agitator.

5. In a stock feeder, a feed hopper having an outlet at its lower end, a feed trough to receive the feed from said hopper, an agitating member in said hopper pivoted at its lower end to the wall of said hopper, the lower end of said agitator being extended through the open lower end of said hopper to the exterior thereof, an operating bar having its lower end pivotally connected with the lower end of said agitating member, a door for said feed trough, and a pivotal connection between said door and the upper end of said operating bar.

6. In a stock feeder, a feed hopper having an outlet at its lower end, a feed trough to receive the feed from said hopper, a pair of toothed agitating membmers in said hopper pivotally connected at their upper ends to the walls thereof, the lower ends of each of said agitating members being extended so as to project through the open lower end of said hopper to the exterior thereof, an operating draw-bar, links for connecting the lower end of said draw-bar to said agitating members, a gravity-operated door for said feed trough, a crank arm connected with said door, a pin on said crank arm extending through a slotted opening in the upper end of said operating bar, and a coil spring connected with said bar and with a fixed point.

7. In a stock feeder, a feed hopper, a feed trough to receive the feed from said hopper, an agitator in said feed hopper extending to a point adjacent the bottom of said hopper; a door for said feed trough adapted to be moved to open position by an animal but restored to closed position when released by the animal, and operating devices between the lower end of said agitator and door located wholly upon the outside of said hopper and operable to operate said agitator only upon the opening of the door, said agitator being otherwise restored to normal position upon the closing of said door, said operating devices comprising a loose connection to permit the door to open or close independently of any movement of said agitator in the event said agitator is held by the feed in the position to which it is moved by the opening of said door.

LEONARD C. ALESHIRE.